(12) United States Patent
Hwang et al.

(10) Patent No.: US 10,171,843 B2
(45) Date of Patent: *Jan. 1, 2019

(54) VIDEO SEGMENT MANAGER (71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,665

(22) Filed: Jan. 19, 2017

(65) Prior Publication Data

US 2018/0205978 A1 Jul. 19, 2018

(51) Int. Cl.
*H04H 60/32* (2008.01)
*H04N 21/234* (2011.01)
*H04N 21/466* (2011.01)
*H04N 21/25* (2011.01)
*H04N 21/45* (2011.01)
*H04N 21/258* (2011.01)
*G06K 9/00* (2006.01)
(Continued)

(52) U.S. Cl.
CPC ... *H04N 21/23424* (2013.01); *G06K 9/00718* (2013.01); *G06K 9/00765* (2013.01); *H04N 21/23418* (2013.01); *H04N 21/252* (2013.01); *H04N 21/25891* (2013.01); *H04N 21/44204* (2013.01); *H04N 21/4532* (2013.01); *H04N 21/4667* (2013.01); *H04N 21/84* (2013.01)

(58) Field of Classification Search
CPC combination set(s) only.
See application file for complete search history.

(56) References Cited

U.S. PATENT DOCUMENTS 6,480,840 B2 11/2002 Zhu et al.
8,341,152 B1 12/2012 Bates
(Continued)

FOREIGN PATENT DOCUMENTS

WO 2014100374 A2 6/2014

OTHER PUBLICATIONS

List of IBM Patents or Patent Applications Treated as Related, Appendix P, Filed Herewith, 2 pages.
(Continued)

*Primary Examiner* — Mulugeta Mengesha
(74) *Attorney, Agent, or Firm* — Ulysses Williams, III (57) ABSTRACT A method includes identifying a plurality of user-interested multimedia files based at on one of a history of a plurality of user multimedia searches, a plurality of user multimedia views, or a history of multimedia sharing with other users. The method creates a catalog of the plurality of user-interested multimedia files, wherein the catalog includes one of more groups of the plurality of multimedia files based on one of a multimedia file length, the history of the plurality of user multimedia searches, the plurality of user multimedia views, or a history of multimedia shares with other users. The method generates a novel multimedia file, where combining one generates the novel multimedia file or more individual multimedia files selected from the catalog of multimedia files.

15 Claims, 4 Drawing Sheets

(51) Int. Cl.
*H04N 21/84* (2011.01)
*H04N 21/442* (2011.01)

(56) References Cited

U.S. PATENT DOCUMENTS

| | | | |
|---|---|---|---|
| 8,873,851 B2 | 10/2014 | Fedorovskaya et al. | |
| 8,897,485 B2 | 11/2014 | Fedorovskaya et al. | |
| 8,949,873 B1 | 2/2015 | Bayer et al. | |
| 9,014,509 B2 | 4/2015 | Fedorovskaya et al. | |
| 9,635,400 B1 | 4/2017 | Sherrets et al. | |
| 9,659,595 B2 | 5/2017 | Eronen et al. | |
| 9,769,524 B2 | 9/2017 | Gopalan et al. | |
| 2008/0209351 A1 | 8/2008 | Macadaan et al. | |
| 2009/0172733 A1 | 7/2009 | Gibbon et al. | |
| 2012/0128334 A1 | 5/2012 | Cheok et al. | |
| 2013/0073675 A1 | 3/2013 | Hwang et al. | |
| 2013/0074133 A1 | 3/2013 | Hwang et al. | |
| 2013/0275611 A1* | 10/2013 | Somekh | H04N 21/251 709/231 |
| 2013/0325869 A1* | 12/2013 | Reiley | G06F 17/3002 707/741 |
| 2014/0164507 A1* | 6/2014 | Tesch | H04L 51/10 709/204 |
| 2014/0172863 A1 | 6/2014 | Imbruce et al. | |
| 2014/0226955 A1 | 8/2014 | Man | |
| 2014/0280548 A1 | 9/2014 | Langlois et al. | |
| 2015/0066583 A1 | 3/2015 | Liu et al. | |
| 2015/0163530 A1 | 6/2015 | Bayer et al. | |
| 2015/0208000 A1 | 7/2015 | Ojanpera | |
| 2015/0296228 A1* | 10/2015 | Chen | G06F 17/30029 725/34 |
| 2015/0312649 A1 | 10/2015 | Goplan et al. | |
| 2015/0365725 A1 | 12/2015 | Belyaev et al. | |
| 2016/0118083 A1 | 4/2016 | Wu et al. | |
| 2017/0171630 A1 | 6/2017 | Liu et al. | |

OTHER PUBLICATIONS

Hwang, et al., "Video Segment Manager", U.S. Appl. No. 15/722,056, filed Oct. 2, 2017.

Gesenhues, Amy, "Study: Number of People Who Share or Post Videos Online has Doubled Since 2009", Oct. 10, 2013, Marketing Technology Management, Copyright Third Door Media, Inc., 7 pages.

Rothganger, et al., "Segmenting, Modeling, and Matching Video Clips Containing Multiple Moving Objects", Department of Computer Science and Beckman Institute, 35 pages, printed Sep. 22, 2016.

"Amara makes video globally accessible—Captions, subtitles, and translations simplified.", 4 pages, printed Sep. 22, 2016, <https://amara.org/en/>.

"Find the right scenes fast", FVC, Videocataloger, 3 pages, <http://videocataloger.com/feature1/search-and-find-videos/>.

"Audition Deep Dive: REMIX—Automatically rearrange any song to fit any duration", Adobe Creative Cloud, Nov. 30, 2015, 5 pages.

"Captions Made Simple", Rev, 5 pages, printed Sep. 22, 2016.

"How to share a YouTube video with a specific start and end time", Stack Exchange, 2 pages, printed Sep. 22, 2016.

Hwang et al., "Video Segment Manager", U.S. Appl. No. 15/936,498, filed Mar. 27, 2018, 26 pages.

Hwang et al., "Video Segment Manager", U.S. Appl. No. 15/936,505, filed Mar. 27, 2018, 26 pages.

IBM, "List of Patent Applications Treated As Related", Appendix P, Dated Mar. 26, 2018, 2 pages.

"The Best Motivation Video 2015—Become More", Motivational Videos, You Tube, Published May 27, 2014, <https://www.youtube.com/watch?v=chEIHV99xak&start=53&end=59>.

\* cited by examiner

VIDEO SEGMENT MANAGER

BACKGROUND

The present invention relates generally to the field of video content, and more particularly to the editing and sharing of video content.

Video segment manipulation and video segment sharing accounts for much of the activity performed by a user on social media. Typically, social media users view or share a video with other users. Social media users manipulate videos to create a new video or to combine those videos with videos created by other users.

With the spread of broadband Internet access, video segments have become very popular online. Whereas most of this content is non-exclusive and available on competing sites, some companies produce all their own videos and do not rely on the work of outside companies or amateurs. Some video segments are taken from established media sources. Community or individually produced video segments account for many video segments on the Internet.

The growing number of mobile device users that utilize smartphones has allowed for an increase in the number of mobile device users that have near immediate access to content on the Internet. Particularly, video content has become a center point for obtaining and sharing information between users. That information can include video content pertaining to news events or entertainment. Social media websites have become an outlet for a user to view a particular video and share the particular video with another user. Additionally, social media websites have become a medium for a user to be able to view a particular video, perform changes to the particular video, and share the particular video, with the performed changes, with other users.

SUMMARY

Embodiments of the present invention include a method, computer program product, and computer system for editing and sharing of video content.

A computer-implemented method includes identifying, by one or more processors, a plurality of user-interested multimedia files based at least on one of: a history of a plurality of user multimedia searches, a plurality of user multimedia views, or a history of multimedia sharing with other users; creating, by one or more processors, a catalog of the plurality of user-interested multimedia files, wherein the catalog includes one of more groups of the plurality of multimedia files based at least on one of: multimedia file length, the history of the plurality of user multimedia searches, the plurality of use multimedia views, or a history of multimedia shares with other users; and generating, by one of more processes, a novel multimedia file, wherein the novel multimedia file is generated by combining one or more individual multimedia files selected from the catalog of multimedia files.

DETAILED DESCRIPTION

Figure 1:
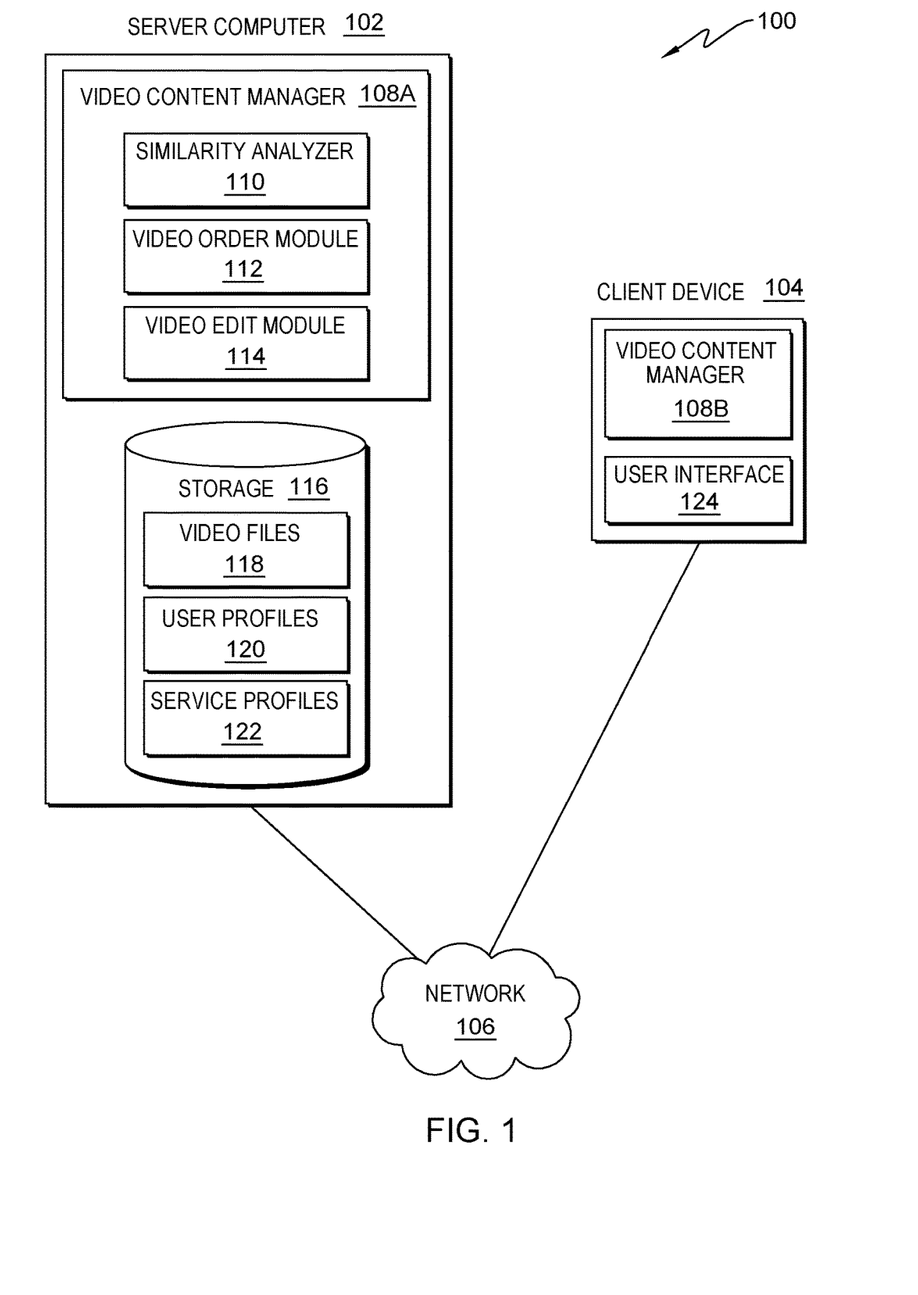
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, generally designated 100, illustrating a distributed data processing environment. Distributed data processing environment 100 includes server computer 102, and client device 104, all interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In one embodiment, server computer 102 includes video content manager program 108A, similarity analyzer 110, video order module 112, video edit module 114, storage 116, video files 118, user profiles 120, service profiles 122, accessible by client device 104, and any other electronic devices not illustrated in FIG. 1, via network 106.

Client device 104 may be a laptop computer, tablet computer, netbook computer, personal computer (PC), personal digital assistant (PDA), smartphone, wearable device (e.g., smart watch, personal fitness device, personal safety device), or any programmable computer system known in the art with an interactive display. Client device 104 includes video content manager program 108B and user interface 124. In general, client device 104 is representative of any programmable electronic device or combination of programmable electronic devices capable of executing machine-readable program instructions and communicating with users of other electronic devices via network 106. Client device 104 may also include various programs not illustrated in FIG. 1. The various programs on client device 104 include a web browser, an electronic mail client, security software (e.g., a firewall program, a geo-locating program, an encryption program, etc.), an instant messaging (IM) application (app), and a communication (e.g., phone) application.

In one embodiment, video content manager program 108A operates on server computer 102. In another embodiment, video content manager program 108B operates in a client-side based setting, for example on client device 104. In yet another embodiment, video content manager program 108A operates on server computer 102 simultaneously with video content manager program 108B operating on client device 104. Video content manager program 108A provides the capability to search for, detect, analyze, and share a video, or multimedia, segment for a user of client device 104 and provide the user of client device 104 with an ordered presentation of the individual video, or multimedia, segments. Video content manager program 108A can receive user preferences for analyzing videos or multimedia of interest to the user. Video content manager program 108A stores the user preferences in the form of a user profile for the user of client device 104 among user profiles 120. Video content manager program 108A can search for, detect, share, and determine when the user of client device 104 is being presented with a video and determine the segmented order, and relevance of each segment to the user based on the user preferences. Video content manager program 108A displays the segmented video with a determined beginning and end of the segmented video of interest to the user. Video content manager program 108A can modify the video segments and reorder the video segments based on user preferences. Subsequently, video content manager program 108A can share the modified video segments with another receiver or a group of receivers (i.e., users) after reordering the video segment consistent with the original user preferences.

In one embodiment, video content manager program 108A has the ability to analyze video similarities, and data of the presented video segments, to determine whether redundant video segments and quality of the data can be filtered out of the ordered segments that will be presented to the user. In this embodiment, video content manager program 108A modifies and presents the reordered video segments based on the user preferences selected for redundancy of video segments and data quality. Through the functions of similarity analyzer 110, video order module 112, video edit module 114, and storage 116, video content manager program 108A utilizes the video segment history, and user preferences to analyze the video. Similarity analyzer 110 performs the operation, as a function of video content manager program 108A, of analyzing returned video segment similarities and video segment quality. Similarity analyzer 110 filters out low-quality video segments, redundant video segments, and helps group together video segments with similar video content. Video order module 112 performs the operation, as a function of video content manager program 108A, of receiving the returned video segments, ordering the returned video segments that video content manager program 108A modified, and then connecting the video files together in a new seamless video segment. Video content manager program 108A connects the video segments based on user preferences. Video edit module 114 performs the operation, as a function of video content manager program 108A, of reordering the video segments into groups based on user preferences. Video edit module 114 sends the video segment groups to designated users. Video files 118 are encoded and stored video data that may be a catalogue of video segments saved in frames, groups of similar video segments, single video segment file, or permutations of video segments at various stages of the ordering and reordering process of video content manager program 108A.

User profiles 120 includes personal data associated with a specific user. User profile 120 is the profile for saving user personal characteristics, preference records, and personal searching history. Service profiles 122 is a profile for saving remix rules, search engine configuration, user-interested video segment rating rules, and factors for ordering and reordering video segments. This data is stored in storage 116 and used by video content manager program 108A to automatically select video segments during a keyword search process, and to order and reorder selected video segments. In addition, video content manager program 108A incorporates the stored information when providing recommendations for action.

In general, network 106 can be any combination of connections and protocols that will support communications among server computer 102 and client device 104. Network 106 can include, for example, a local area network (LAN), a wide area network (WAN), such as the Internet, a cellular network, or any combination of the preceding, and can further include wired, wireless, and/or fiber optic connections. In one embodiment, video content manager program 108A can be a web service accessible via network 106 to a user of client device 104. In another embodiment, video content manager program 108A may be operated directly by a user of server computer 102.

Storage 116, a database, located on server computer 102, represents any type of storage device capable of storing data that is accessed and utilized by video content manager program 108A. In other embodiments, storage 116 represents multiple storage devices within server computer 102. Storage 116 stores information such as, but not limited to, account information, credentials for authentication, user preferences, lists of preferred users, previously analyzed videos, previously segmented videos, popular video segments, and frequently watched videos that have been modified by video content manager program 108A.

In one embodiment, a user of client device 104 can interact with user interface 124 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate user interface 124 operating within the GUI of client device 104. User interface 124 accepts input from a plurality of input/output (I/O) devices including, but not limited to, a tactile sensor interface (e.g., a touch screen or a touchpad) referred to as a multi-touch display. An I/O device interfacing with user interface 124 may be connected to client device 104, which may operate utilizing wired (e.g., USB port) or wireless network communications (e.g., infrared, NFC, etc.). Client device 104 may include components, as depicted and described in further detail with respect to FIG. 4, in accordance with embodiments of the present invention.

Figure 2:
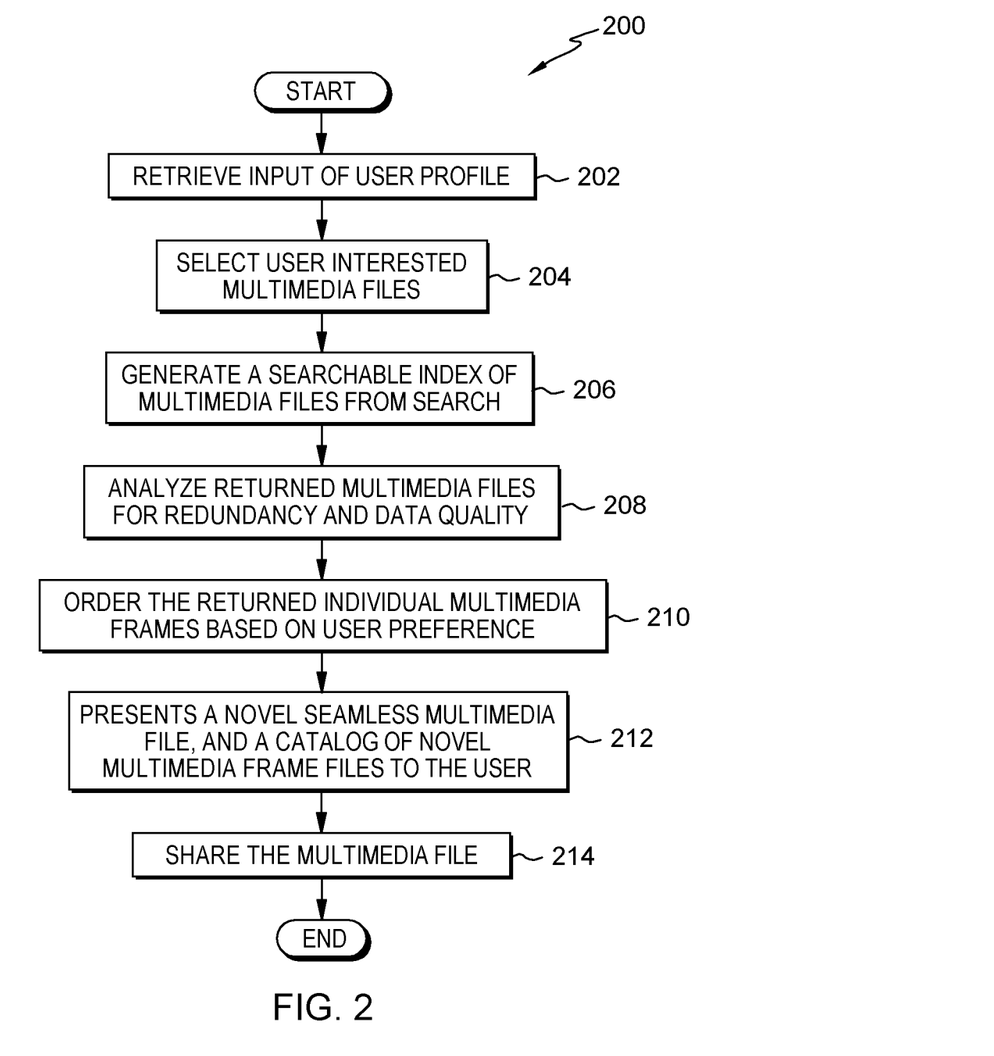
FIG. 2 is a flowchart depicting operational steps of a video content manager program 108A for analyzing a video and providing segmented portions of the video based on user preferences executing on a server computer within the distributed data processing environment of FIG. 1, in accordance with an embodiment of the present invention.

FIG. 2 is a flowchart, generally designated 200, depicting operational steps of video content manager program 108A for analyzing a video and providing segmented portions of the video based on user preferences, in accordance with an embodiment of the present invention.

Video content manager program 108A retrieves input of a user profile (202). In one embodiment, video content manager program 108A retrieves user preferences, via user profile 120, and service preferences, via service profile 122, which include but are not limited to, video search engine configuration, rating of interested videos and video segments, tagging preferences for ordering and reordering video segments, personal characteristics, preference records, and personal search histories. Video content manager program 108A stores the user preferences associated with a user profile in storage 116. Video content manager program 108A can receive a user name (i.e., account information) associated with an account, along with password (i.e., credentials) associated with existing user profile. Upon authentication of the credentials for the received account information, video content manager program 108A can prompt the user to update new preferences on user-defined video interests.

Additionally, video content manger program 108A can prompt the user to specify new video topics of interest or delete older video topics that video content manager program 108A maintains in storage 116.

Video content manager program 108A selects user-interested multimedia files (204). In one embodiment, video content manager program 108A generates a function, via a software as a service (SaaS) application program interface (API) video search engine, to automatically search for, and select, video frames and video files which match user viewing history, and user profile interested video portions based on the name of a person, such as a celebrity or movie star. For example, video content manager program 108A searches videos scanned from the Internet based on the history of the user watching videos. Video content manger program 108A determines whether any of the scanned video file names, titles, video frames, video segments, subtitles in videos, or audio sounds interest the user. In an example, video content manager program 108A determines that a user has watched more than 15 different videos, over the course of a month, where a particular actor was present. Video content manager program 108A determines that the user is interested in the particular actor and utilizes this information to determine videos of interest to the user in future searches.

In another embodiment, video content manager program 108A determines a user is interested in a particular aspect of a video based upon a user action of repeatedly watching a specific portion of the video segment. Video content manager program 108A analyzes the aspects of the video, such as subtitles, the nature of conversations in the video, characters in the video, background color, and objects in the video. Video content manager program 108A incorporates this information and integrates this data in future searches for user-interested multimedia files.

In one embodiment, video content manager program 108A generates a function, via a SaaS API video search engine, to search multiple keywords of user metadata based upon previously inputted keywords. For example, video content manager program 108A searches descriptions in stored data of Short Message Service (SMS) text messages, social media messaging services, audio files, images, and video sharing history to search for, and select, user interested video content. For example, video content manager program 108A scans user video sharing history in order to learn past videos of interest to the user. Video content manager program 108A uses the archive of past videos of interest to the user to formulate and suggest new videos of interest to the user. In an example, a user sends multiple SMS text messages including selected video segments of a football game to another user. Video content manager program 108A determines that the user is interested in the football teams present in the video, and the football players that are predominantly depicted in the video segment. In this example, video content manager program 108A further determines that the user and recipient are interested in video segments that involve certain aspects of the football game.

Video content manager program 108A generates a searchable index of multimedia files from the search (206). In one embodiment video content manager program 108A returns all related video files, with start and end positions of the videos in the video files, associated with the user-preference settings. For example, video content manager program 108A presents the user with 5 different video segments that are grouped together. This grouping of video files of varying lengths is a searchable index. In an embodiment, video content manager program 108A tags each video frame of interest to the user based upon user preferences. For example, based upon user preferences, video content manager program 108A tags each video frame that has the presence of an actor, and assigns the video frames a rating based upon the presence, or absence, or frequency of appearance of the actor in the video frame. In another embodiment, video content manager program 108A determines a video frame grouping according to background lighting in the frame. In another example, video content manager program 108A associates frames of the video that take place in outer space in the video file of a movie, and matches the video frames segment by segment, irrespective of the original order of the video, in a searchable index. Video content manager program 108A deconstructs the returned video file into segments according to user preference and presents them in a frame by frame order.

In another embodiment, video content manager program 108A, using video frame metadata, breaks the video segments into individual video frames based upon time of appearance in the video, the background color of the video, the background music in the video, or the characters in the video. For example, video content manager program 108A creates a searchable index of video segments using time as the basis for deconstructing the video, in two-second intervals for a two-minute video, based on user preferences. Video content manager program 108A creates an index of 60 video frames, in two-second intervals, from a returned video file segment. In addition, video content manager program 108A may present the user with the option to view the video frames, further subdivided, into 120, one-second frame intervals. Video content manager program 108A may present the additional viewing option in a side by side manner for the user to compare the 120 video frame interval index to the 60 video frame interval index. In another embodiment, a user presented with the video frame subdivision by video content manager program 108A may query video content manager program 108A to condense the video frames into a smaller index of video frames. For example, video content manager program 108A, based on a query by the user, may change the video frame interval from two seconds to five seconds. The total number of video frames presented by video content manager program 108A changes from 60 frames in total, to 24 frames in total for a two-minute video.

Video content manager program 108A analyzes the returned multimedia files for redundancy and data integrity (208). In an embodiment, video manager program 108A analyzes the returned video files for redundancy, and the criterion of the data. For example, video content manager program 108A analyzes the returned, deconstructed video file and determines that several of the video segments present identical frames. In a deconstructed two-minute video frame, video content manager program 108A determines that from the 30-second mark to the 35-second mark, the video frames are identical (i.e., redundant) in presenting the same background in the video. Video content manager program 108A, via the function of similarity analyzer 110, determines that the segments of the video are redundant and video content manager program 108A deletes them from the index of video frames that have been expanded from video segments. In the embodiment, video content manager program 108A determines that the video frames present the same character in the same position over the course of a 15-second interval. In this embodiment, video content manager program 108A determines that the multiple video frames can be condensed into one frame instead of the many frames, via similarity analyzer 110, spaced over the 15-second interval because an identical character in the video is in the same position in the video frame over the course of the video interval for 15 seconds.

In another embodiment, video content manager program 108A determines that none of the video frames are redundant, but the quality of the data distorts the presented video frame. In this embodiment, video content manager program 108A deletes the distorted video frame, via similarity analyzer 110, because the quality of the data does not meet a quality threshold. In another embodiment, video content manager program 108A, via similarity analyzer 110, determines that some of the video frames over the course of a pre-defined time interval are a combination of being redundant, and of low quality, or some of the video frames are low quality, or some of the video frames in the time interval are redundant. In an embodiment, video content manager program 108A, via similarity analyzer 110, deletes the individual video frames that are of low quality and redundant, and simultaneously condenses the redundant video frames into one frame.

Video content manager program 108A orders the returned individual multimedia frames based on user preferences (210). In one embodiment, video content manager program 108A constructs individual video segments, via video order module 112, based upon user preferences. For example, video content manager program 108A, via video order module 112, may construct a novel video segment, from individual video frames, according to preferences, such as interest rating, video quality, background color, or time line. Video content manager program 108A, via video order module 112, constructs a new video segment based upon video frame ordering, according to a ranking that video content manager program 108A assigned to the individual video frame, based upon user preferences. For example, video content manager program 108A determines that the user is particularly interested in video frames where an actor is present for three seconds. Video content manager program 108A ranks the frames on a scale of 1 to 10 based upon the presence of an actor, and the ranking system is scored based upon the length of time that the actor is present. A frame with a top ranking of one indicates that the actor is present the longest in comparison to the other frames. Video content manager program 108A constructs a new set of video frames, constituting a novel video segment, according to this ranking, irrespective of the order that each frame was presented in the original video. In another embodiment, video content manager program 108A constructs a video frame presentation in designated intervals according to user preference. For example, video content manager program 108A constructs the video frames such that there are five, one-minute video segments of the original video file that is ten minutes in duration.

Video content manager program 108A presents a novel seamless multimedia file, and a catalog of novel multimedia frame files to the user (212). In an embodiment, video content manager program 108A, via video order module 112, presents a new seamless video to the user and a catalog of individual video frames that have similar clips. In an example, video content manager program 108A presents the user the newly constructed video in a single and seamless video file. In addition, video content program 108A presents the user a catalog of a group of unique video segments that share similar video frames with the new video file. The catalog of additional videos can be of different lengths, from different users, in unique orientations. Video content manager program 108A presents the user videos that were previously constructed by other users, according to user preferences, that share similar video segments to the new video file created by video content manager program 108A. In another embodiment, video content manager program 108A reviews the additional videos and compares the videos for dissimilar content, based on user preferences, which may be of interest to the user. For example, video content manager program 108A analyzes the catalog of video clips and based upon the history of a user watching videos, determines a particular segment of a video file may be of interest to the user. The user may add one or more files from the catalog of individual video frames. In another embodiment, video content manager program 108A may present the user with just a novel, seamless video. In this example, video content manager program 108A does not present the user with any catalog of related video frames according to user preference.

In another embodiment, video content manager program 108A can query the user to add video frames of interest to create a new seamless video segment from the catalog of video files presented to the user. The user has the ability to accept or reject the request to add the video frames from the catalog of videos. In another embodiment, video content manager program 108A automatically adds video frames of interest from the catalog of additional videos based upon user preferences that rank an aspect of the video frame as important. For example, video content manager program 108A determines that the presence of a scene in a movie is of importance to the user because of how rare scenes from this movie are in other user videos. Video content manager program 108A combines the video frame from the catalog of video files, based upon user preferences, to the newly created seamless video file.

Video content manager program 108A shares the video file (214). In one embodiment, video content manager program 108A shares the video with a designated group of users, based on user preferences, via a function of video edit module 114. In this embodiment, video content manager program 108A shares the new video file with a group of users that video content manager program 108A determines have shared interests based upon a video sharing history of the group of users. For example, video content manager program 108A, via video edit module 114, determines that a particular user shares similar interest to another user based upon the frequency of video files shared and the content of the video files the particular user shares. As a result, video content manager program 108A shares the video with the particular user. In another embodiment, video content manager program 108A determines that it should not share the video because of the nature of the content in the video. For example, video content manager program 108A, via video edit module 114, analyzes the content of the newly created video file and determines that sharing the newly created video file would result in the user violating several international copyright laws.

Figure 3:
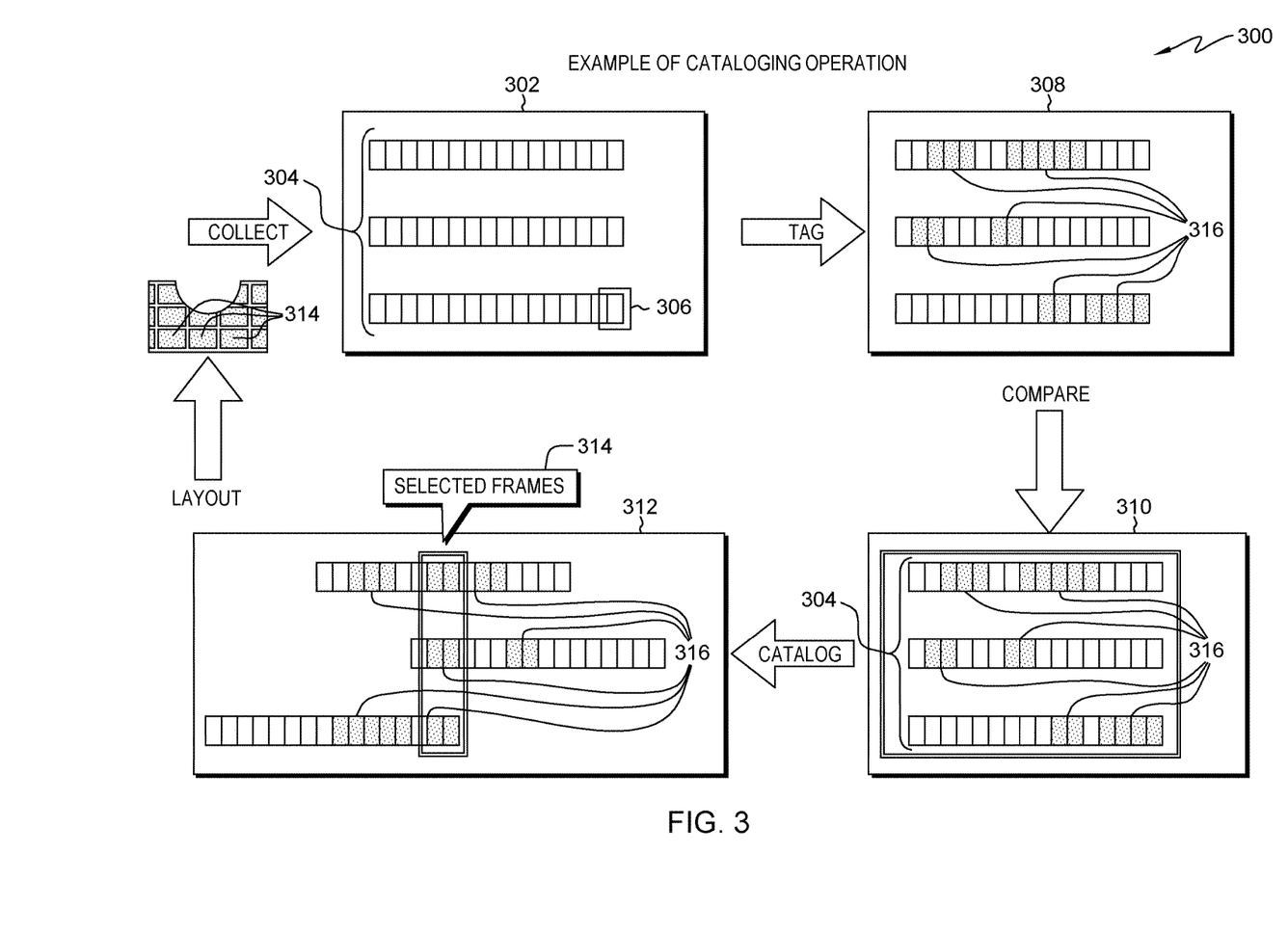
FIG. 3 illustrates an example of the video content manager program creating a catalog of video files, operating on a client device within the distributed data processing environment of FIG. 1 (e.g., a smartphone), modifying one or more video segments on the client device, in accordance with the present invention.

FIG. 3 illustrates an example of video content manager program 108B creating a catalog of video files, operating on client device 104 (e.g., a smartphone), modifying one or more video segments on client device 104, in accordance with the present invention.

In the depicted embodiment, video content manager program 108B retrieves a user profile with corresponding user preferences and selects user-interested video portions by searching and collecting a grouping, or catalog, of video segments 304 from the Internet in process 302. Video segments 304 represent a catalog of individual video segments, constructed of multiple individual video frames 306. The number of video segments that video content manager program 108B searches and the number of video frames comprising each video segment is specified in the user preferences that video content manager program 108B receives. Video frame 306 represents an individual unit of a video segment that can be any length (e.g., 0.5 seconds), according to user preferences. In process 308, video content manager program 108B tags or designates, individual video frames 316 of interest to the user across the catalog of video segments 304 according to user preferences. In one embodiment, video content manager program 108B tags, or designates, individual video frames 316 of interest based upon user preferences for selecting individual video frames for truncating from their original video segments and re-cataloging the video frames. Video content manager program 108B extracts information from the catalog of video segments 304 and the selected individual video frames 316 to determine a video frame boundary to truncate the individual video frames based upon user preferences received by video content manager program 108B.

In process 310, video content manager program 108B compares the selected individual video frames 316 and catalog of video segments 304 through a comparison algorithm generated based upon user preferences, for supporting a similarity analysis of a video segment grouping and individual video frames 316 within the video segment catalog. In process 312, video content manager program 108B catalogs the selected individual video segments 316 based upon calculated video segment and video frame characteristics determined by video content manager program 108B. In process 312, video content manager program 108B automatically catalogs the individual video frames 316 based upon cataloging rules determined by video content manager program 108B that are a function of user preferences. Video content manager program 108B calculates the similarity of the different video segments, and the video frames according to the aspects of the catalog of video segments, and video frames that were selected by video content manager program 108B. Video content manager program 108B creates a novel catalog of video segments utilizing selected video frames 314 out of individual video frames 316 cataloged from various points in the original video segment. In one embodiment, video content manager program 108B creates a new layout of video frames from the original truncated and collected video segments. Video content manager program 108B creates a new catalog of the selected video frames 314 based upon start and end parameters that were determined by video content manager program 108B.

Figure 4:
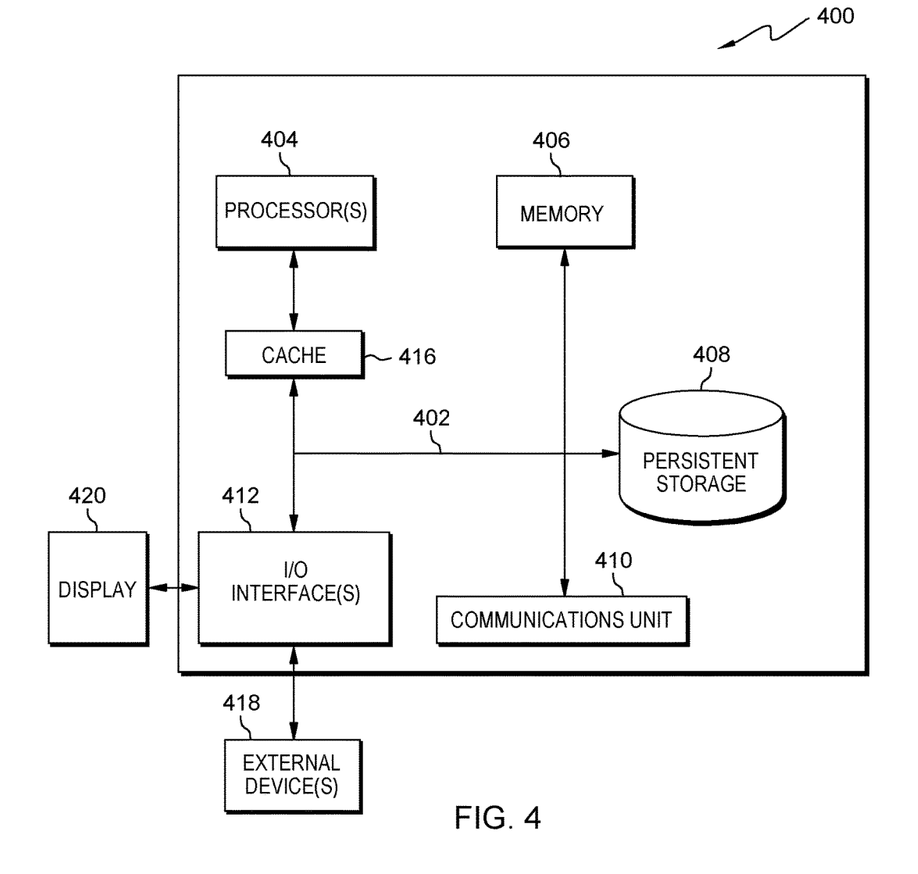
FIG. 4 is a block diagram of components of a computer system, such as the server computer of FIG. 1, in an embodiment in accordance with the present invention.

FIG. 4 depicts computer system 400, where computer system 400 represents a computer system in distributed data processing environment 100. Server computer 102 represents an example of a computer system in distributed data processing environment 100, where server computer 102 includes video content manager program 108A. Computer system 400 includes processors 404, cache 416, memory 406, persistent storage 408, communications unit 410, input/output (I/O) interface(s) 412 and communications fabric 402. Communications fabric 404 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    identifying, by one or more processors, a plurality of multimedia files that are of interest to a user based on historical activity of the user viewing multimedia files;
    determining, by one or more processors, an order for the plurality of multimedia files that are of interest to the user according to user preferences associated with the user, wherein the user preferences dictate a truncation of user interested multimedia file frames comprising the plurality of multimedia files that are of interest to the user;
    creating, by one or more processors, a catalog of the identified plurality of multimedia files that are of interest to the user, wherein the catalog includes the identified plurality of multimedia files organized into one or more groups of multimedia files based on user preferences and characteristics of the multimedia files;

selecting, by one or more processors, one or more multimedia file segments from the catalog of the identified plurality of multimedia files that are of interest to the user;

generating, by one of more processes, a novel multimedia file, wherein the novel multimedia file is generated by combining the selected one or more multimedia file segments;

truncating, by one or more processors, a user interested multimedia file according to user preferences, and displaying, by one or more processors, the truncated user interested multimedia file frames.

2. The method of claim 1, further comprising:

determining, by one or more processes, a ranking of individual multimedia files within the plurality of multimedia files that are of interest to the user based upon an algorithm for generating the novel multimedia file.

3. The method of claim 1, further comprising:

determining, by one or more processors, a criterion for each of the plurality of the user interested multimedia files.

4. The method of claim 1, further comprising:

presenting, by one or more processors, a searchable index of a plurality of novel multimedia files;

responsive to displaying the novel multimedia file, identifying, by one or more processors, one or more novel multimedia file frames included in the novel multimedia file of interest to the user; and sending, by one or more processors, the one or more novel multimedia file frames to another user.

5. The method of claim 1, further comprising:

analyzing, by one or more processors, a plurality of catalogs that include multimedia files that are of interest to the user based upon an algorithm, wherein the plurality of catalogs include the created catalog of the identified plurality of multimedia files that are of interest to the user; and responsive to receiving, from the user, a selection of one or more multimedia file frames from the plurality of catalogs that include multimedia files that are of interest to the user, determining, by one or more processors, a similarity value for the selected one or more multimedia file frames according to the algorithm.

6. The method of claim 1, further comprising:

wherein the historical activity of the user viewing multimedia files includes activities selected from the group consisting of: a history of multimedia searches by the user, a plurality of multimedia views by the user, and a history of multimedia sharing with other users; and wherein the user preferences and characteristics of the multimedia files include information selected from the group consisting of: multimedia file length, the history of the plurality of user multimedia searches, the plurality of use multimedia views, or a history of multimedia shares with other users.

7. A computer program product comprising:

one or more computer readable storage media and program instructions stored on at least one of the one or more storage media, wherein the computer readable storage media is not a transitory signal per se, the program instructions comprising:

program instructions to identify a plurality of multimedia files that are of interest to a user based on historical activity of the user viewing multimedia files;

program instructions to determine an order for the plurality of multimedia files that are of interest to the user according to user preferences associated with the user, wherein the user preferences dictate a truncation of user interested multimedia file frames comprising the plurality of multimedia files that are of interest to the user;

program instructions to create a catalog of the identified plurality of multimedia files that are of interest to the user, wherein the catalog includes the identified plurality of multimedia files organized into one or more groups of multimedia files based on user preferences and characteristics of the multimedia files;

program instructions to select one or more multimedia file segments from the catalog of the identified plurality of multimedia files that are of interest to the user;

program instructions to generate a novel multimedia file, wherein the novel multimedia file is generated by combining the selected one or more multimedia file segments;

program instructions to truncate a user interested multimedia file according to user preferences, and program instructions to display the truncated user interested multimedia file frames.

8. The computer program product of claim 7, further comprising program instructions, stored on the one or more computer readable storage media, which when executed by a processor, cause the processor to:

determine a ranking of individual multimedia files within the plurality of multimedia files that are of interest to the user based upon an algorithm for generating the novel multimedia file.

9. The computer program product of claim 7, further comprising program instructions, stored on the one or more computer readable storage media, which when executed by a processor, cause the processor to:

determine a criterion for each of the plurality of the user interested multimedia files.

10. The computer program product of claim 7, further comprising program instructions, stored on the one or more computer readable storage media, which when executed by a processor, cause the processor to:

present a searchable index of a plurality of novel multimedia files;

responsive to displaying the novel multimedia file, identify one or more novel multimedia file frames included in the novel multimedia file of interest to the user; and send the one or more novel multimedia file frames to another user.

11. The computer program product of claim 7, further comprising program instructions, stored on the one or more computer readable storage media, which when executed by a processor, cause the processor to:

analyze a plurality of catalogs that include multimedia files that are of interest to the user based upon an algorithm, wherein the plurality of catalogs include the created catalog of the identified plurality of multimedia files that are of interest to the user; and responsive to receiving, from the user, a selection of one or more multimedia file frames from the plurality of catalogs that include multimedia files that are of interest to the user, determine a similarity value for the selected one or more multimedia file frames according to the algorithm.

12. A computer system comprising:
one or more computer processors;
one or more computer readable storage media, wherein the computer readable storage media is not a transitory signal per se; and
program instructions stored on the computer readable storage media for execution by at least one of the one or more computer processors, the program instructions comprising:
program instructions to identify a plurality of multimedia files that are of interest to a user based on historical activity of the user viewing multimedia files;
program instructions to determine an order for the plurality of multimedia files that are of interest to the user according to user preferences associated with the user, wherein the user preferences dictate a truncation of user interested multimedia file frames comprising the plurality of multimedia files that are of interest to the user;
program instructions to create a catalog of the identified plurality of multimedia files that are of interest to the user, wherein the catalog includes the identified plurality of multimedia files organized into one or more groups of multimedia files based on user preferences and characteristics of the multimedia files;
program instructions to select one or more multimedia file segments from the catalog of the identified plurality of multimedia files that are of interest to the user;
program instructions to generate a novel multimedia file, wherein the novel multimedia file is generated by combining the selected one or more multimedia file segments;
program instructions to truncate a user interested multimedia file according to user preferences, and
program instructions to display the truncated user interested multimedia file frames.

13. The computer system of claim 12, further comprising program instructions, stored on the one or more computer readable storage media, which when executed by a processor, cause the processor to:
determine a criterion for each of the plurality of the user interested multimedia files.

14. The computer system of claim 12, further comprising program instructions, stored on the one or more computer readable storage media, which when executed by a processor, cause the processor to:
present a searchable index of a plurality of novel multimedia files;
responsive to displaying the novel multimedia file, identify one or more novel multimedia file frames included in the novel multimedia file of interest to the user; and
send the one or more novel multimedia file frames to another user.

15. The computer system of claim 12 further comprising program instructions, stored on the one or more computer readable storage media, which when executed by a processor, cause the processor to:
analyze a plurality of catalogs that include multimedia files that are of interest to the user based upon an algorithm, wherein the plurality of catalogs include the created catalog of the identified plurality of multimedia files that are of interest to the user; and
responsive to receiving, from the user, a selection of one or more multimedia file frames from the plurality of catalogs that include multimedia files that are of interest to the user, determine a similarity value for the selected one or more multimedia file frames according to the algorithm.

* * * * *